April 15, 1924.
H. VANDERBEEK
1,490,649
LEVER ATTACHMENT FOR SHAFTS
Filed Aug. 7, 1922
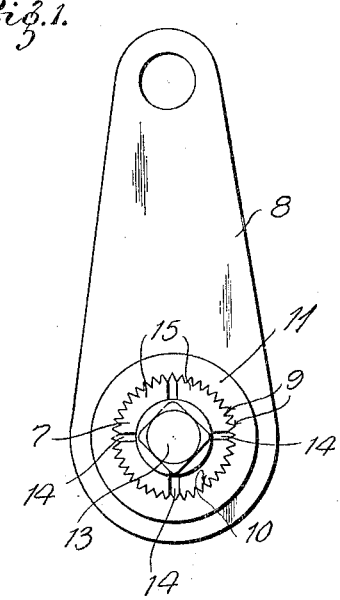
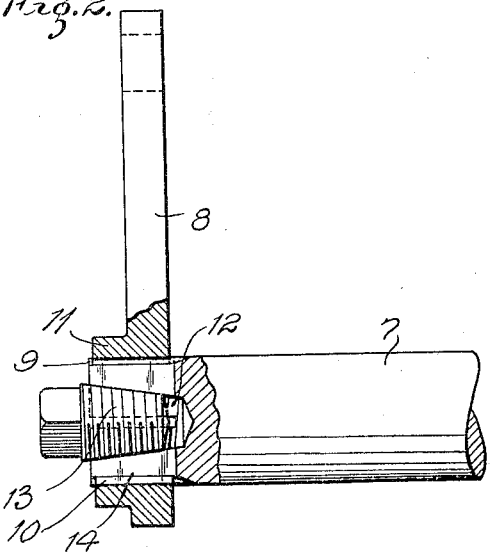
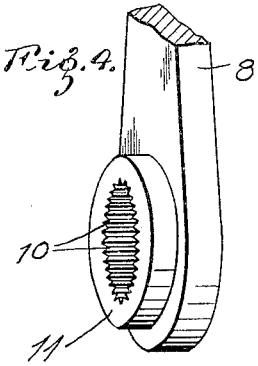
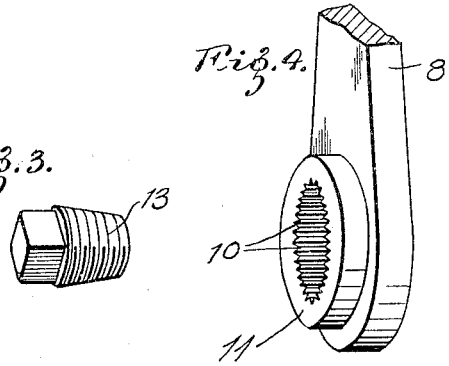
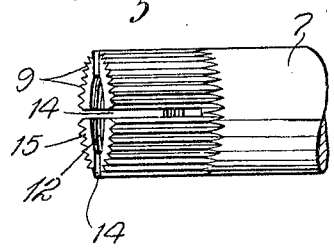
Inventor
Herbert Vanderbeek,
by Carr & Carr,
his Attorney.

Patented Apr. 15, 1924.

1,490,649

UNITED STATES PATENT OFFICE.

HERBERT VANDERBEEK, OF DETROIT, MICHIGAN, ASSIGNOR TO THE TIMKEN DETROIT AXLE COMPANY, OF DETROIT, MICHIGAN, A CORPORATION OF MICHIGAN.

LEVER ATTACHMENT FOR SHAFTS.

Application filed August 7, 1922. Serial No. 580,320.

*To all whom it may concern:*

Be it known that I, HERBERT VANDERBEEK, a citizen of the United States, and a resident of the city of Detroit, in the county of Wayne and State of Michigan, have invented a new and useful Improvement in Lever Attachments for Shafts, of which the following is a specification.

This invention relates to improved means for rigidly securing a lever, wheel or other member to a shaft, and has for its principal objects to enable the lever to be quickly and easily attached to the shaft with a comparatively fine degree of circumferential adjustment with relation thereto and to provide means for readily securing said lever in the desired adjusted position. The invention consists in the combinations and arrangements of parts hereinafter described and claimed.

In the accompanying drawing, wherein like reference numerals refer to like parts wherever they occur, Fig. 1 is an end view of a shaft and lever conforming to my invention;

Fig. 2 is a side view thereof, the shaft and the lever being shown partly in section; and Figs. 3, 4 and 5 are perspective views illustrating, respectively, the expansion plug, the lever and the shaft detached.

For purposes of illustration, my invention is shown in connection with an automobile brake-rod or shaft 7 and the operating lever 8 therefor, which device requires provision to be made for securing a comparatively fine angular adjustment of the lever on the shaft; but the invention is capable of extensive application in connection with other devices requiring fine circumferential adjustment of one member relative to another.

The end of the rod or shaft 7 that receives the operating lever 8 has a multiplicity of ridges and furrows or fine serrations or teeth 9 formed thereon that cooperate with corresponding serrations or teeth 10 formed in the circular shaft receiving opening in the hub 11 of the lever. The serrated end portion of the rod or shaft 7 is provided with a tapered screw threaded bore 12 adapted to receive a correspondingly tapered screw threaded plug 13, whose outer end is squared, whereby it can be rotated. The serrated end portion of the rod or shaft 7 is split radially, as at 14, preferably at intervals of ninety degrees. These slits divide the serrated end portion of the shaft into a series of radially spaced sections or segments 15.

In assembling the parts, the tapered plug 13 is threaded part way into the tapered bore 12 in the split end portion of the shaft and the operating lever 8 is then positioned on the serrated end portion of the shaft in the desired angular position. The tapered plug 13 is then screwed home, thus expanding or spreading apart the split portions 15 of the shaft, which action serves to increase the pressure of the contact between the intermeshing serrations on the shaft and the lever and thereby prevents circumferential and longitudinal movement of the lever on the shaft.

The advantages of my invention are that it permits the lever to be readily attached to and detached from the shaft; that it permits a very fine angular adjustment of the lever with relation to the shaft; and that it prevents movement of the lever both circumferentially and longitudinally of the shaft.

What I claim is:

1. The combination with a shaft whose end portion is split and provided with a multiplicity of fine V-shaped serrations extending longitudinally thereof, of a member having an opening provided with a multiplicity of similar fine V-shaped serrations adapted to intermesh with the serrated surface of said split end portion, said split end portion being provided with an axially extending bore, and a tapered plug arranged in said bore for increasing the pressure of contact between the serrated surfaces of said shaft and said member, thereby preventing circumferential and longitudinal movement of said member on said shaft.

2. The combination with an automobile brake rocker shaft whose end portion is split radially and provided with a series of fine serrations extending longitudinally thereof, of an operating lever for said shaft, said lever having an opening adapted to fit said split end portion, said opening being provided with a series of similar fine serrations adapted to intermesh with the serrations on the split end portion of said shaft, whereby a fine circumferential adjustment of said lever is permitted on said shaft, the split end portion of said shaft being provided with a tapered and threaded bore, and a tapered and threaded plug arranged in said bore for increasing the pressure of contact between the cooperating serrations on said shaft and said lever, thereby preventing both circumferential and longitudinal movement of said lever on said shaft.

Signed at Detroit, Michigan, this 2nd day of Aug., 1922.

HERBERT VANDERBEEK.